Dec. 26, 1967    E. A. PETERSON ETAL    3,360,417
HEAT SEALING MACHINE FOR BONDING FLEXIBLE STRIPS
TO THERMOPLASTIC SURFACES
Filed April 1, 1964    4 Sheets-Sheet 1

INVENTORS:
EVERETT A. PETERSON
HAROLD W. PETERSON
BY Maxwell, Johnston, Cook
& Root
ATT'YS INVENTORS
EVERETT A. PETERSON
HAROLD W. PETERSON
BY Maryall, Johnston, Cook & Root
ATT'YS

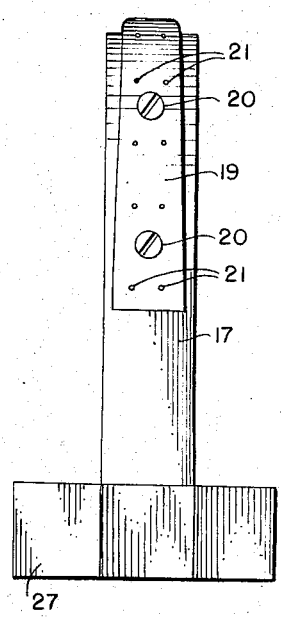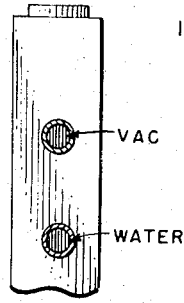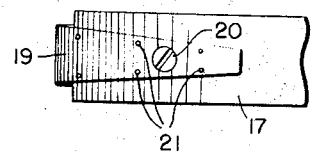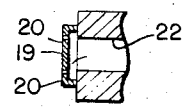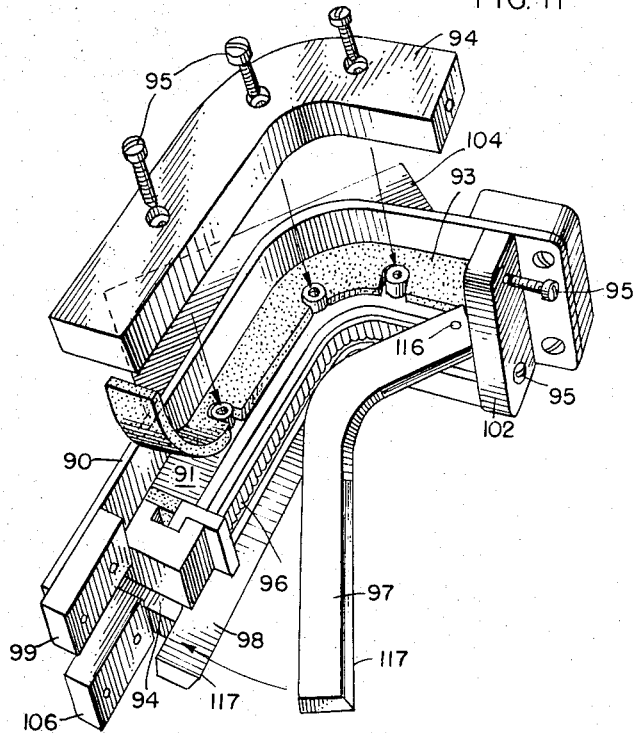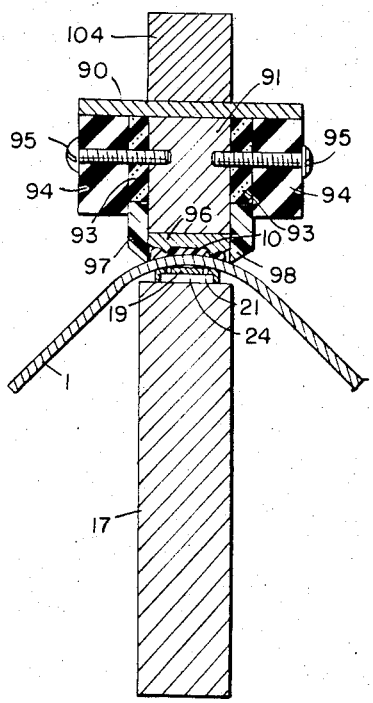

Dec. 26, 1967  E. A. PETERSON ETAL  3,360,417
HEAT SEALING MACHINE FOR BONDING FLEXIBLE STRIPS
TO THERMOPLASTIC SURFACES
Filed April 1, 1964  4 Sheets-Sheet 4

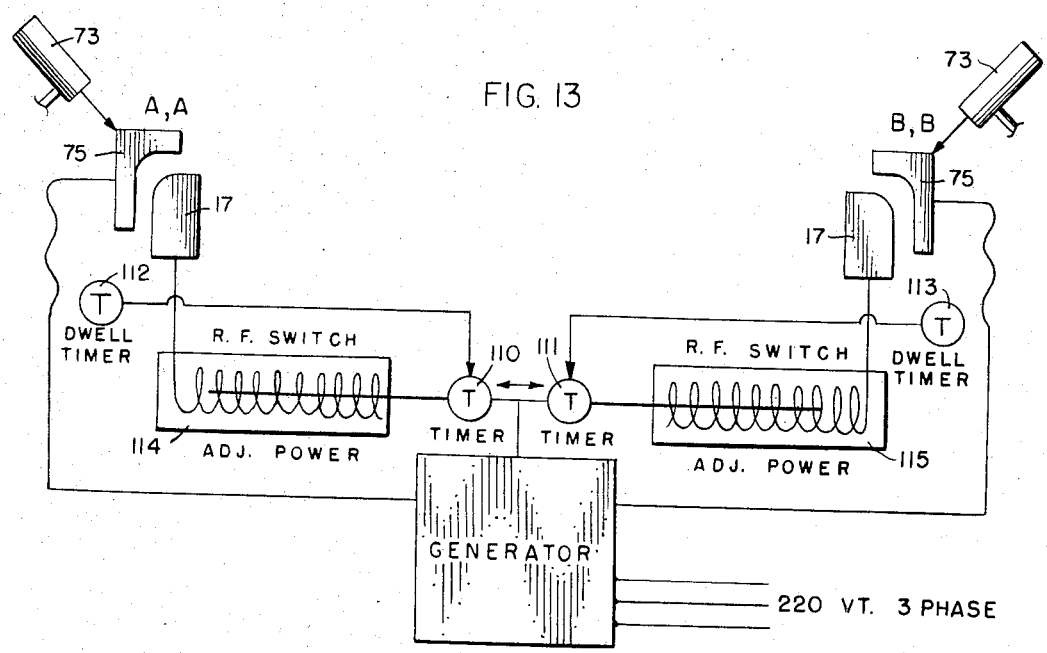

|  | 30 SEC. | 1 SEC. | 15 SEC. | 1 SEC. | 15 SEC. | 1 SEC. |
|---|---|---|---|---|---|---|
| PISTON | A-A<br>B-B<br>(SEE FIG. 15) | | | | | |
| GENERATOR<br>(R.F. ONLY) | | | 5 SEC.<br>A | | 5 SEC.<br>B | |
| WATER<br>(OPTIONAL) | | | | | | |
| VACUUM | | | | | | |
| UNLOAD &<br>INSTALL BOX<br>& CORNER STRIPS | | | | | | |

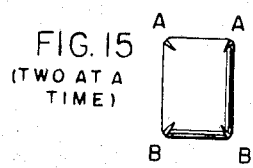

FIG. 15
(TWO AT A TIME)

INVENTORS:
EVERETT A. PETERSON
HAROLD W. PETERSON
BY Maryall Johnston, Cook
& Root
ATT'YS

United States Patent Office 3,360,417
Patented Dec. 26, 1967

3,360,417
HEAT SEALING MACHINE FOR BONDING FLEXIBLE STRIPS TO THERMOPLASTIC SURFACES
Everett A. Peterson, Roslyn Heights, and Harold W. Peterson, Roslyn, N.Y., assignors to Peterson Electronic Die Co., Inc., Mineola, N.Y., a corporation of New Jersey
Filed Apr. 1, 1964, Ser. No. 356,579
5 Claims. (Cl. 156—380)

ABSTRACT OF THE DISCLOSURE

Machines for applying flexible strips by heat-sealing thereof to corners of hollow shells, said machine including spaced, anvil electrodes on movable bases at the inner corners of the hollow shell, an electrode-pressure shoe for each anvil electrode providing in pairs spaced electrodes across which a high frequency electrical current can be applied, said shoes being mounted on the piston rod of respective pneumatic pistons and movable toward and away from said anvil electrodes, the pneumatic cylinders of said pistons being mounted on head members lockably slidable on vertical posts, each pressure shoe comprising a curved pressure bar, a curved holding bar pivotally supported on each side of said pressure bar, an edge of each holding bar projecting beyond the pressure face of the respective pressure bar, foam elastometer strips resiliently biasing said holding bars and urging said edges to positions projecting beyond the respective pressure faces, and vacuum means connected via a vacuum passage in each anvil electrode with apertures through the shell-contacing faces of said anvil electrodes.

---

This invention pertains to machines for applying flexible strips and the like to articles. In its preferred form, the machines are designed to apply and secure, by electronic heat sealing, strips of thermoplastic resin to a thermoplastic outer covering of a hollow shell or the like at the outer corners thereof.

Hollow shells are used as component parts of articles of luggage, phonograph cases, courier cases, portable typewriter cases, etc. These shells are usually covered with a sheet of flexible material, such as leather, imitation leather, thermoplastic sheeting, woven Fiberglas, cloth or the like to improve the appearance of the item. One of the problems encountered in covering a shell with a single sheet of flexible sheeting is that the sheeting must have sufficient stretch so that it can be stretched at the corners of the shell without tearing. The majority of covering materials, however, do not have the requisite amount of stretch to permit their use in covering of the aforesaid character.

The type of coverings for which the preferred form of the machines of the invention is designed pertains to coverings wherein the cover sheeting may be cut at the portion of the covering across the corners of the shells to which the covering is applied. An area of sheeting is cut out at each corner so that the sheeting will not fold or overlap at the corner when it is adhered to the shell. The side edges of the cut out portion are abutted or are approximately abutted when the sheeting is applied to the shell. A strip of thermoplastic resin or polymer is then heat-sealed on the covered corner of the shell to hide the cut and also to provide a wear-resistant member.

The preferred embodiment is illustrated in the drawings wherein:

FIG. 7 is a front elevation of an anvil electrode of the machine.

FIG. 8 is a fragmentary, rear elevation of said anvil electrode while FIG. 9 is a fragmentary, top plan view of said anvil electrode.

FIG. 10 is a section of a fragment of said anvil electrode.

FIG. 11 is an exploded, perspective view of an electrode-pressure shoe used to apply the reinforcing strip.

FIG. 12 is a section of an avil electrode and an electrode-pressure shoe with a hollow shell (shown in fragment) and a strip being applied thereto between said shoe and anvil electrode.

FIG. 13 is a diagrammatic view of the power unit for applying high frequency energy to the electrodes.

FIG. 14 is a step-time sequence chart of the steps performed by the machine.

FIG. 15 is a diagram of one of the sequences of operations which may be used in applying the strips on a hollow shell.

Figure 1:
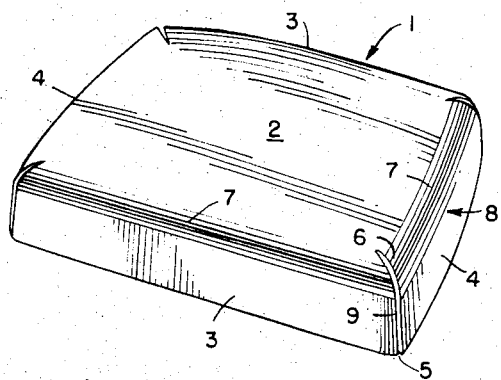
FIGS. 1 and 2 are perspective views of a hollow shell covered with a thermoplastic sheet, e.g., the type of shell used in articles of luggage, portable cases, etc., prior to application and after application of the wear-reinforcement, thermoplastic strips to the corners thereof, respectively.

Referring to the drawings, there is shown in the illustrated embodiment a hollow shell 1 comprising a side wall 2 and end wall pairs 3, 3 and 4, 4. These walls form a hollow shell adapted to be used as a part of an article of luggage, a portable case, and the like. Two such shells can be hinged together in opposing relationship to form an article of luggage or other hollow container or case.

The hollow shells 1 may be made of any material of suitably rigidity for the use desired. They may be made, for example, from metal, molded fiber, molded Fiberglas, molded wood chips, or the like wherein the fibers or chips are bonded together by a thermoplastic or thermosetting resin. They also may be made from molded thermoplastic or thermosetting resins.

The corners formed at the junctures of the end walls 3, 4 are, for purposes of the invention, preferably rounded corners 5 having dome corners 6. The side wall 2 and the end walls 3, 3 and 4, 4 may be joined by rounded corners 7.

The hollow shell 1 is covered by a flexible sheeting 8 adhered tightly to the walls 2, 3, 4. The corners of the flexible sheeting 8 are cut, prior to its being applied and adhered on the shell 1, to remove a section of the sheeting at each corner so that the cut edges 9 are in abutment or at least approximate abutment when the flexible sheeting is applied to and adhered on the shell. The depth to which the flexible sheeting is cut preferably is sufficient so that the cut extends slightly inwardly of the dome section 6 of the shell, as can be seen in FIG. 1.

The butted joint or the space between the cut edges 9 is covered by a decorative, wear-resistant strip 10 which is a thermoplastic resin or polymer which is heat-sealable with or adhesively secured to the covering sheet 8. The strip 10 is adhesively secured to or heat-sealed on each corner of the covered shell. The strips 10 are of a length and width sufficient to cover any spacing between cut edges 9. The machine of the invention is designed for electronic, high frequency heat-sealing of the strips 10 on the covering 8 of the shell.

Figure 2:
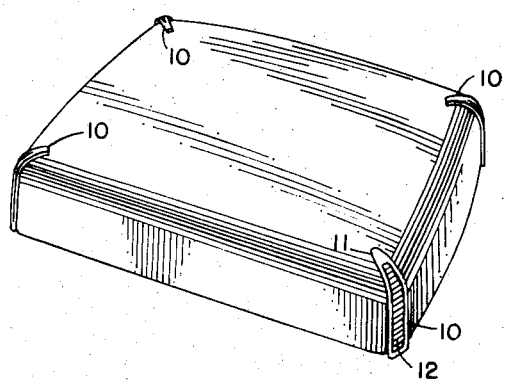

The strips may have a tapered end 11 which curves over the rounded corners of the shell. Also, the pressure plates of the shoes of the machine, which plates each press a strip 10 against the rounded corners of the shell, may have a design therein to impart a design to the strips as the strips are pressed against and heat-sealed on the shells. The illustrated design embossed in the strips 10 is that shown at 12 in FIGS. 2 and 3. There are many plastics that can be heat-sealed by radio frequency energy wherein the heat for sealing is generated inside the plastic by passage of high frequency radio waves therethrough. As an example, the covering 8 and the strips 10 both may be polyvinyl chloride.

Referring now to FIGS. 4 and 6–12, the machine for applying the corner strips comprises four anvil electrodes 13–16 located in the upper center portion of the machine. Each anvil electrode comprises a metal anvil body 17 (FIGS. 4 and 7–10) with a rounded, outer, upper corner 18 curved similarly to the curve of the corners 6 of the shell 1. The corner 18 carries a curved mandrel 19 held thereon by screws or dowels 20. The plate 19 is a channel member with a plurality of vacuum holes 21 in the wall thereof.

The anvil body 17 has an air passage therethrough coupled at one end thereof with a vacuum line 23 and communicating at its other end with the channel passage 24 formed by the channel plate 19.

If desired, the anvil electrodes may be cooled by providing liquid coolant passages 25, 26 through the anvil body 17. The liquid coolant, e.g., water, is circulated through passages 25, 26 via conduits (not shown) sealingly coupled to the ends of passages 25 and 26.

Figure 6:
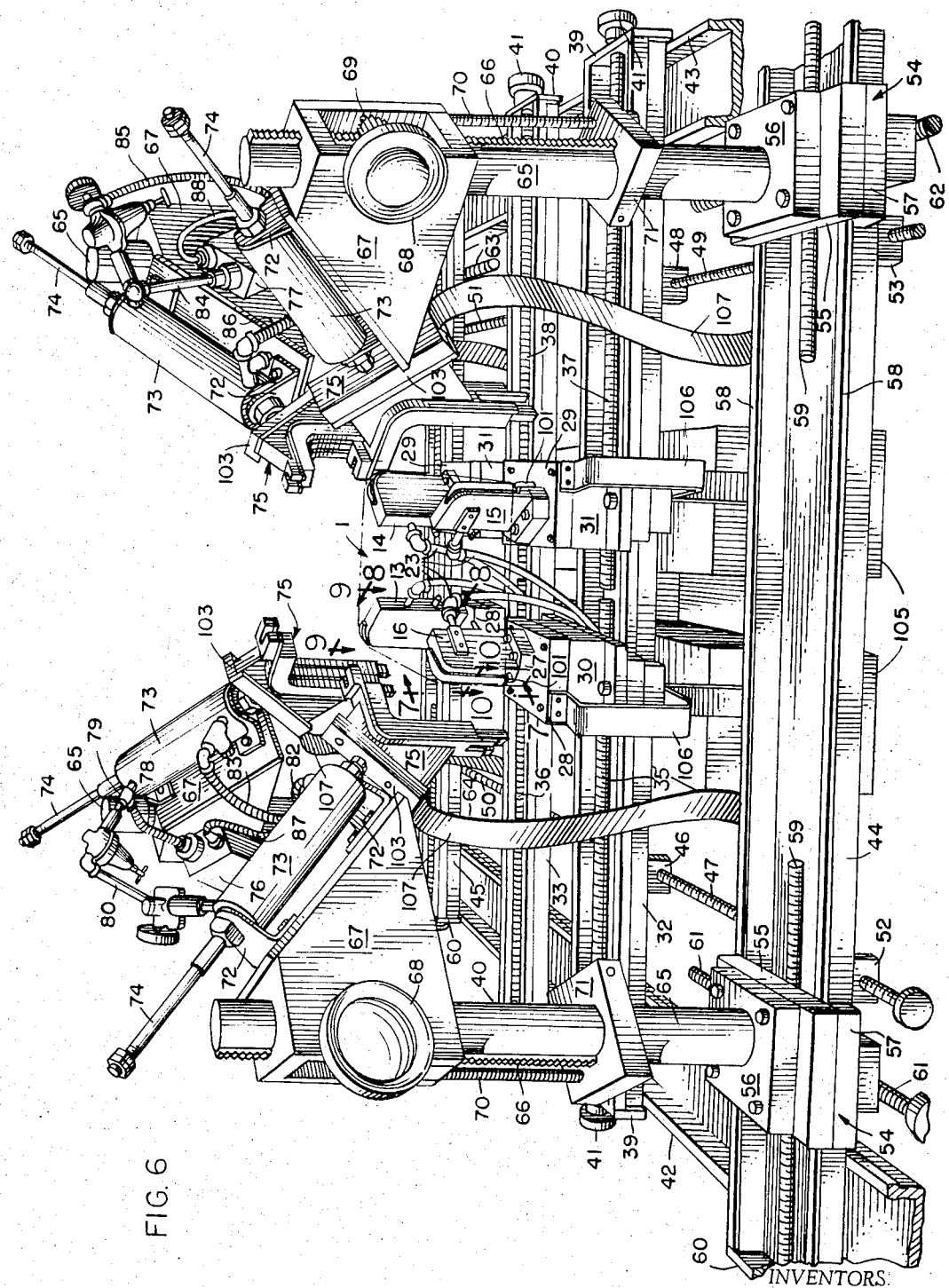
FIG. 6 is a perspective view of the entire machine constituting the preferred embodiment.

Referring particularly to FIG. 6, the bases 27 of anvil electrodes 13–16 are mounted on carriage plates 28, 29, which in turn are mounted on carriages 30, 31, respectively. The carriages 30, 31 are slidably mounted on carriage tracks 32, 33 extending longitudinally of the machine frame. Each carriage 30, 31 has a threaded hole in which is threaded a threaded shaft or rod 35, 36, 37, or 38, as the case may be. At each end of the carriage tracks 32, 33, there is a fixed plate 39, 40, respectively, in which the threaded rods are mounted in a manner so as to allow rotation thereof but to preclude axial movement thereof. By turning knobs 41 on the end of each threaded rod, the carriage may be moved to and fro along the carriage tracks 32, 33 to selectively position any one of the anvil electrodes 13–16.

The carriage tracks 32, 33 slidably rest on fixed cross frame members, i.e., the channel members 42, 43. The cross frame members 42, 43 also slidably support front, frame channel member 44 and a rear, frame channel member 45.

The underside of carriage track 32 has depending therefrom a pair of plates or brackets 46, 48 in which are rotatably mounted the ends of threaded shafts or rods 47, 49, which ends are mounted for rotation in plates or brackets 46, 48 with preclusion of axial movement relative thereto. The threaded rods 47, 48 are threadedly mounted in brackets or plates 52, 53 fixedly attached to the underside of frame member 44. The carriage track 32 and the parts supported thereon are thus movable toward and away from frame member 44 by turning rods 47, 49 in the appropriate direction. The carriage track 33 and parts carried thereon is movable toward and away from frame member 45 by similar mounting of threaded rods 50, 51 on the undersides of carriage track 33 and frame member 45.

Each of front and rear frame members 44, 45 carry two base assemblies 54 which are slidable longitudinally along the frame members. The base assemblies comprise a cross plate 55 to which is bolted a flange plate 56 and from which depend on opposite sides of frame members 44, 45 side guide bars 57, which may have lips or equivalent structural members extending below the flanged edges 58 of the frame members.

The base assemblies 54 are thus slidable along frame member 44 or 45. They may be adjustably positioned therealong by means of threaded rods 59 rotatably held in end plates 60 and threadedly engaged with a member fixedly attached to each base assembly in the same manner as the structure aforedescribed with reference to threaded rods 35–38.

The frame members 44, 45 may be positioned adjustably relative to each other and frame members 42, 43 by threaded rods 61, 62, 63, 64 coupled by similar structure (not shown) so as to make frame member 44 movable along frame members 42, 43 upon turning rods 61 and 62 and so as to make frame member 45 movable along frame members 42, 43 upon turning rods 63 and 64.

The flange plates 56 each support a vertical shaft 65 having a toothed rack 66 thereon. Each shaft 65 has slidably mounted thereon a hollow, shoe-supporting head 67 in which is rotatably mounted a shaft which is rotatable by knob 68 and which carries a pinion 69. The pinion 69 engages rack 66, and the shoe-supporting head 67 can be adjusted up or down on shaft 65 by turning knob 68. It is held in the adjusted position by bringing the end of the threaded rod 70 into engagement with the underside of head 67, the rod being threaded in the plate 71 attached to the shaft 65.

Each shoe-supporting head 67 has mounted thereon by means of brackets 72 a pneumatic cylinder 73 in which there is a reciprocable piston (not shown) having piston rod 74. The pneumatic cylinders are oriented so as to point angularly downwardly toward the center area of the machine. Each piston rod carries an electrode-pressure shoe 75, the structure of which is detailed in FIGS. 4, 11 and 12. The shoes 75 are reciprocable from the illustrated, rest position shown in FIG. 6 toward work position wherein they are juxtapositioned with the respective anvil electrodes 13–16, e.g., FIGS. 4 and 12.

The pneumatic cylinders 73 are of conventional construction. The air feed lines are connected to the cylinders in pairs whereby the shoes are moved into and out of operative position in pairs. The pairs are designated A, A and B, B in FIG. 15. The main air pressure lines supply pressurized air to valved control boxes 76, 77 of any suitable type, e.g., solenoid valve operated units. One air line 78 from control box 76 is coupled by T coupling 79 and air line 80 to the outer ends of two pneumatic cylinders whereby these cylinders operate in tandem. The other air line from control box 76 is connected to the inner ends of said cylinders via lines 82, 83.

The other two pneumatic cylinders 73 operate in tandem by virtue of connection of air line 84 to the outer end of one cylinder and to the outer end of the other of the cylinder pair via line 85. The inner ends of said cylinders are connected with control box by air line 86 and a similar line (not shown) to the inner end of the other cylinder. The electrical wires for the solenoid valve units of the control boxes are shown at 87, 88. The details of the cylinders, control boxes, etc., are not specifically illustrated inasmuch as these parts are known and are available in commercial channels.

The electronic or high frequency heat-sealing shoes 75 each comprise a curved, metal back plate 90 having mounted thereon an L-shaped, metal shoe bar 91. The sides of the shoe-bar are covered by foam elastomer, L-shaped strips 93. The outer members of the unit are synthetic resin, L-shapel bars 94 held on the shoe bar 91 by screws 95 through bars 94 and synthetic resin cross bar 102.

Figure 3:
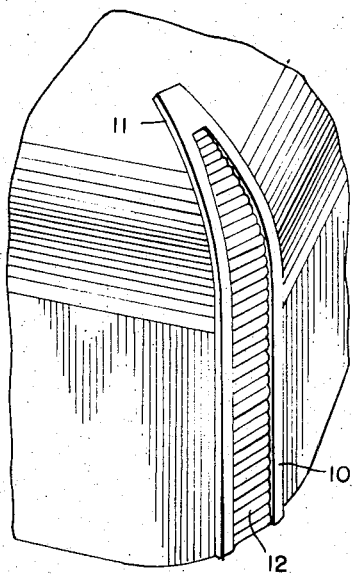
FIG. 3 is a perspective, fragmentary view of a corner of the shell of FIG. 2 with the wear-reinforcement strip thereon.
Figure 4:
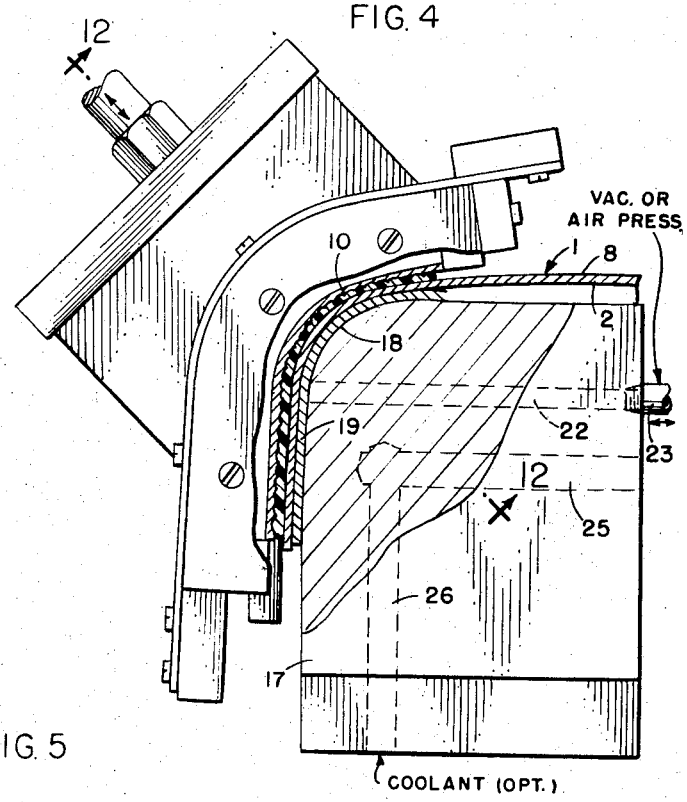
FIG. 4 is a side view, partly in section, of the electrodes of the machine for applying the wear-reinforcement strips to the covered shell.
Figure 5:
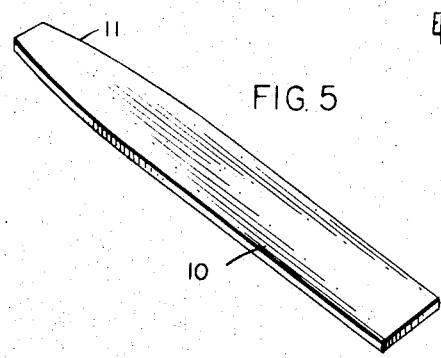
FIG. 5 is a perspective view of a wear-reinforcement strip.

The inner edge of the shoe bar 91 has a metal, L-shaped pressure bar 96 ribbed to give the ribbed design to the strip 10 as shown in FIG. 3. The strip 10 is placed between swingable, synthetic resin arms 97, 98 and held therebetween against bar 96. The edges of arms 97, 98 press against the outside of the shell 1, the arms being resiliently biased in this position by the compressible foam elastomer strips 93. The arms 97, 98, each being pivotally mounted by a pin 116 and resiliently biased as aforesaid, are free to flex at the ends opposite the pivots when pressure is applied on edges 117. The arms maintain tight contact with the luggage shell and thereby prevent exuding extrusion of the edges of thermoplastic strip 10 when it is heated by pressure bar 96. Without this containment of strip 10, its edges would be ill-defined and unsightly.

For alignment purpose, the lower edge of back plate 90 may have a pair of spaced guide bars 99, 100 into which fits the nonconducting guide piece 101 on the anvil electrodes (FIG. 6) when the electrode-pressure shoe approaches the anvil electrode.

Each shoe is mounted on its respective piston rod by means of a mounting plate 103 threaded on the end of the piston rod 74. The plates 103 are bolted to mounting block 104, which in turn is coupled to shoe plate 90.

The strips 10 are heat-sealed to the shell 1 by high-frequency-induced heating. A radio-frequency generator (27 megacycles) is housed in generator housing 105. The anvil electrodes are connected to the R.F. generator output by flexible, conductor strips or cables 106 while the metal mounting plates 103 of the electrode-pressure shoes 75 are connected by conductor strips 107 to ground.

The electronic heating unit is shown diagrammatically in FIG. 13. The R.F. generator operates at a frequency of about 27 megacycles. The high frequency current is transmitted by the anvil electrodes through the dielectric space occupied by the molded fiber shell 1 and the thermoplastic strips 10. The high frequency electric currents generate heat in the thermoplastic strips 10 and the covering 8 of shell 1 to cause the two to fuse together while they are under pressure between the anvil electrodes and the pressure plates of the electrode-pressure shoes. The short duration, high frequency electric current is applied to the anvil electrodes as pairs A, A. or B, B when timer 110 or 111 closes the respective circuit. The dwell timers 112, 113 coact with timers 110, 111, respectively, to control the dwell time for the down position of shoes 75. The current intensity to each anvil electrode body 17 is controlled adjustably by the adjustable R.F. switches 114, 115.

A typical machine cycle is shown in FIG. 14. The water coolant (optional) flows through anvil 17 continuously. The controls for the electronic heating cycles and the pneumatic cylinders may be manually operated switches and valves, respectively, if desired. The vacuum for the anvil electrodes may be continuous.

A 30-second interval is allowed for manual operations of unloading of the finished shell, loading of the next shell and insertion of strips 10 in the shoes 75. All four pistons then move the shoes 13-16 to down position, and electronic heating is applied for five seconds through anvil electrode-pressure shoe seal units A, A to seal the strips 10 on two adjacent corners of the shell. Ten seconds later, the shoes of units A, A are retracted by the respective pistons, and electronic heat-sealing is applied for five seconds through electrode anvil pressure shoe seal units B, B. Ten seconds later, the shoes 75 of units B, B retract, and the shell with four wear-reinforcement strips heat-sealed on the covering 8 at the four corners of the shell is removed.

Vacuum holes 21 perform a very important function. During the sealing cycle, moisture inside the molded shell is turned to steam. Because the flat surface of the anvil is in intimate contact with the shell and because the surface of the electrode 96 on the outside of the shell is not flat, the steam would literally explode through the plastic strip toward electrode 96. This would not only create an unsightly looking part, but would interrupt the R.F. cycle. The vacuum holes 21 permit this steam to escape through the mandrel before the pressure is built up to the point that it would explode toward 96.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A machine for heat-sealing a thermoplastic resin member on a thermoplastic surface of a hollow shell which comprises a plurality of spaced anvil electrodes adapted to hold a hollow shell thereon, movable bases on which said anvil electrodes are mounted whereby the spacing between said electrodes can be changed, a plurality of electrode-pressure shoes, one for each anvil electrode, a pneumatic cylinder having a piston rod mounting each respective shoe on said frame for movement toward and away from the respective anvil electrode, and means for applying a high frequency electric current between each of said electrode-pressure shoes-anvil electrode pairs when they are juxtapositioned.

2. A machine as claimed in claim 1 wherein said pneumatic cylinders are mounted on head members, which are mounted slidably on vertical posts, and means to lock said head members in a desired adjusted position on said posts.

3. A machine for applying a thermoplastic member to a thermoplastic surface of a hollow shell which comprises a machine frame, a plurality of spaced members for holding a hollow shell, a pressure shoe mounted on said frame, said pressure shoe including a curved pressure bar, a curved holding bar pivotally supported on each side of said pressure bar, an edge of each holding bar projecting beyond the pressure face of said pressure bar, and means resiliently biasing said holding bars and urging said edges toward positions projecting beyond said pressure face means to move said pressure shoe toward and away from said hollow shell when it is held on said members, and means for sealing a thermoplastic member to a thermoplastic surface on said hollow shell while said thermoplastic member is pressed against said surface by said pressure shoe.

4. A machine as claimed in claim 3 wherein said spaced members are anvil electrodes, each of said anvil electrodes has a vacuum passage adjacent the face thereof opposite said pressure shoes with apertures through said face between the outer surface thereof and said passage, and means for drawing a vacuum on said passage.

5. A machine as claimed in claim 4 wherein said anvil electrodes and pressure shoes comprise in pairs spaced electrodes across which a high frequency electrical current is applied.

References Cited

UNITED STATES PATENTS

| 2,308,043 | 1/1943 | Bierwirth | 156—380 X |
| 2,574,094 | 11/1951 | Fener et al. | 156—583 |
| 2,623,984 | 12/1952 | Ashley | 156—380 X |
| 2,758,631 | 8/1956 | Peterson et al. | 156—380 |
| 2,991,216 | 7/1961 | Hsu et al. | 156—273 X |
| 3,205,114 | 9/1965 | Gross | 156—380 |

EARL M. BERGERT, *Primary Examiner.*

HAROLD ANSHER, *Examiner.*